(12) United States Patent
Kuwabara

(10) Patent No.: US 7,615,984 B2
(45) Date of Patent: Nov. 10, 2009

(54) DC-DC CONVERTER AND METHOD OF CONTROLLING THEREOF

(75) Inventor: Kesanobu Kuwabara, Azumi (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 104 days.

(21) Appl. No.: 11/470,325

(22) Filed: Sep. 6, 2006

(65) Prior Publication Data
US 2007/0064453 A1 Mar. 22, 2007

(30) Foreign Application Priority Data
Sep. 14, 2005 (JP) ............................. 2005-266268

(51) Int. Cl.
*G05F 1/00* (2006.01)
*H02M 3/335* (2006.01)
(52) U.S. Cl. .................... 323/288; 323/284; 363/21.12; 363/89
(58) Field of Classification Search ............ 363/21.12, 363/41, 131, 132, 97, 15, 21.15, 56.09; 323/282, 323/284, 288
See application file for complete search history.

(56) References Cited

U.S. PATENT DOCUMENTS

| | | | | |
|---|---|---|---|---|
| 5,390,101 A | * | 2/1995 | Brown | 363/20 |
| 6,208,530 B1 | * | 3/2001 | Hosotani | 363/19 |
| 6,760,238 B2 | * | 7/2004 | Charych | 363/97 |
| 6,842,350 B2 | * | 1/2005 | Yamada et al. | 363/21.16 |
| 6,972,970 B2 | * | 12/2005 | Yamada | 363/21.16 |
| 7,180,247 B2 | * | 2/2007 | Kawarazaki | 315/209 R |

FOREIGN PATENT DOCUMENTS

| | | |
|---|---|---|
| JP | 2003-033018 A | 1/2003 |
| JP | 2003-299356 A | 10/2003 |

* cited by examiner

*Primary Examiner*—Jessica Han
*Assistant Examiner*—Emily Pham
(74) *Attorney, Agent, or Firm*—Rossi, Kimms & McDowell, LLP

(57) ABSTRACT

A DC-DC converter can prevent intermittent failure of a PWM or driving signal ($V_M$) when a load becomes light and prevent generation of unusual noise from a transformer. The converter includes a transformer (2) having a primary winding (2a) and a secondary winding (2b), a semiconductor switching element (17) connected to the primary winding (2a), and a control unit controlling turning-ON and OFF periods of the switching element (17) so that an output voltage ($V_O$) matches a reference value ($V_{REF}$). By controlling the turning ON and OFF operation of the switching element (17), a DC voltage exactly equal to the reference value ($V_{REF}$) can be supplied to a load (5). The control unit includes an output voltage detecting and adjusting circuit (6) that outputs a command value ($V_C$) adjusted for the output voltage ($V_O$) and the reference value ($V_{REF}$), a triangular wave generating unit (7), and a comparator (15) that compares the command value ($V_C$) and the triangular wave ($V_T$) to generate the PWM signal ($V_M$) for driving the switching element (17) according to the result of the comparison. The triangular wave generating unit (7) varies the inclination of the triangular wave ($V_T$) in response to increase and decrease of the command value ($V_C$).

4 Claims, 6 Drawing Sheets

DC-DC CONVERTER AND METHOD OF CONTROLLING THEREOF

BACKGROUND

FIG. 5 is a circuit diagram showing a circuit configuration of a flyback-type DC-DC converter disclosed in JP-A-2003-33018. Reference numerals 101, 102, and 103 denote a DC power source, a semiconductor switching element, and a transformer, respectively. Reference numerals 104 and 106 denote diodes, and 105 and 107 denote capacitors. Reference numerals 108 and 111 denote an output voltage detecting and adjusting circuit and a control circuit, respectively. The output voltage detecting and adjusting circuit 108 is formed of a comparator 109 and a photocoupler 110 and associated elements. The control circuit 111 is formed of a comparator 112, a triangular wave generating circuit 113, a driver 114 as a driving circuit of the switching element 102, an AND gate 115, and a rectangular wave generating circuit 116.

Next, an operation of the circuit of FIG. 5 will be briefly explained with reference to a waveform diagram shown in FIG. 6. In the DC-DC converter shown in FIG. 5, a PWM control of a period, in which the switching element 102 is turned ON, is carried out so that the value of an output voltage $V_O$ matches a reference value $V_{REF}$ for the comparator 109. The output voltage of the output voltage detecting and adjusting circuit 108 is taken as a command value $V_C$. The comparator 112 compares the command value $V_C$ with a triangular wave $V_T$ from the triangular wave generating circuit 113, by which a PWM signal $V_M$ is obtained. The AND gate 115 takes a logical product of the PWM signal $V_M$ and the output signal $V_S$ of the rectangular wave generating circuit 116 to obtain a driving signal $V_G$. The driving signal $V_G$ is applied to the switching element 102 through the driver 114 to turn ON and OFF the switching element 102.

Here, the output signal $V_S$ of the rectangular wave generating circuit 116 acts on the switching element 102 to turn ON and OFF the switching element 102 repeatedly when the level of the output signal $V_S$ is at the "High" level. When the output signal $V_S$ is at the "Low" level, the output signal $V_S$ acts on the switching element 102 so as to force the switching element 102 to stop the switching operation. Thus, the output signal $V_S$ acts on the switching element 102 to make the switching element 102 carry out an intermittent oscillation operation. Providing such a forced stopping period for the switching element 102, i.e., a period in which the switching is halted temporarily, reduces the number of switching operation per unit time to reduce the switching losses or conduction losses.

The noise included in the command value $V_C$ transmitted through the photocoupler 110 prevents a normal comparison (discrimination) between the command value $V_C$ and the triangular wave $V_T$ as shown in FIG. 6 when the load becomes light to reduce the command value $V_C$. As a result, no PWM signal $V_M$ from the comparator 112 becomes temporarily obtainable to produce a period with intermittent failure of the PWM signal $V_M$.

The above-described intermittent oscillation operation of the switching element 102 by the rectangular wave generating circuit 116 and the AND gate 115 is effective for reducing losses, such as switching losses. The intermittent failure of the PWM signal $V_M$, however, makes the essential ON-OFF operation of the switching element 102 incomplete. The switching operation is required during a switching period in which the output signal $V_S$ of the rectangular wave generating circuit 116 is at the "High" level. This makes it impossible to obtain a DC output voltage desirable for a DC-DC converter. To prevent the intermittent failure of the PWM signal $V_M$ caused by the reduction in the command value $V_C$, a dummy load is connected on the output side of the DC-DC converter to prevent the converter from reaching the light load condition. This, however, reduces the efficiency of the converter.

Accordingly, there remains a need for a DC-DC converter that prevents intermittent failure of a PWM signal $V_M$ when the converter is under a light load to output a desired DC voltage to the load. Moreover, there remains a need for a DC-DC converter that requires no dummy load for improving the efficiency of the converter, by which generation of unusual noise from a transformer can be prevented. The present invention addresses these needs.

SUMMARY OF THE INVENTION

The present invention relates to a DC-DC converter for converting a DC voltage to a DC voltage with a specified magnitude by an ON-OFF operation of a semiconductor switching element and supplying the converted DC voltage to a load and a method of reducing intermittent failure of a PWM signal in such a DC-DC converter.

One aspect of the present invention is a DC-DC converter, which can include a transformer, a semiconductor switching element, and a control unit. The transformer can have a primary winding for applying a DC voltage and a secondary winding for connecting to a load. The semiconductor switching element can be connected to the primary winding. The control unit controls turning ON and OFF periods of the switching element to match the output voltage of the secondary winding to a reference value. Specifically, the control unit switching element is turned ON and OFF to supply a DC voltage equal to the reference value for the load through the secondary wiring of the transformer.

The control unit can include an adjusting unit, a triangular wave generating unit, and a comparing unit. The adjusting unit can output a command value adjusted for the output voltage of the secondary winding and the reference value. The triangular wave generating unit can generate a triangular wave. The comparing unit can compare the command value and the triangular wave to generate a driving signal for the switching element according to the result of the comparison. The triangular wave generating unit can vary the inclination of the triangular wave in response to increase and decrease of the command value. That is, the triangular wave generating unit can vary the inclination of the triangular wave in response to the command value whose magnitude varies depending on the detected value of the output voltage.

The triangular wave generating unit can include a capacitor and a changing unit. The capacitor can connect to a charging and discharging power source. The capacitor can be charged with a voltage depending on an amount of current flowing in the switching element. The changing unit can change the voltage across the capacitor by flowing current whose amount depends on the magnitude of the command value, into the capacitor. The voltage across the capacitor can be input to the comparing unit, with the voltage having a triangular waveform.

Another aspect of the present invention is a method of controlling the DC-DC converter. The method can include outputting a command value adjusted for the output voltage of the secondary winding and the reference value with the adjusting unit, generating a triangular wave with the triangular wave generating unit, comparing the command value and the triangular wave to generate a driving signal for the switching element based on the comparison with the comparing unit, and varying the inclination of the triangular wave in response to increase and decrease of the command value with the triangular wave generating unit.

DETAILED DESCRIPTION

Figure 1:
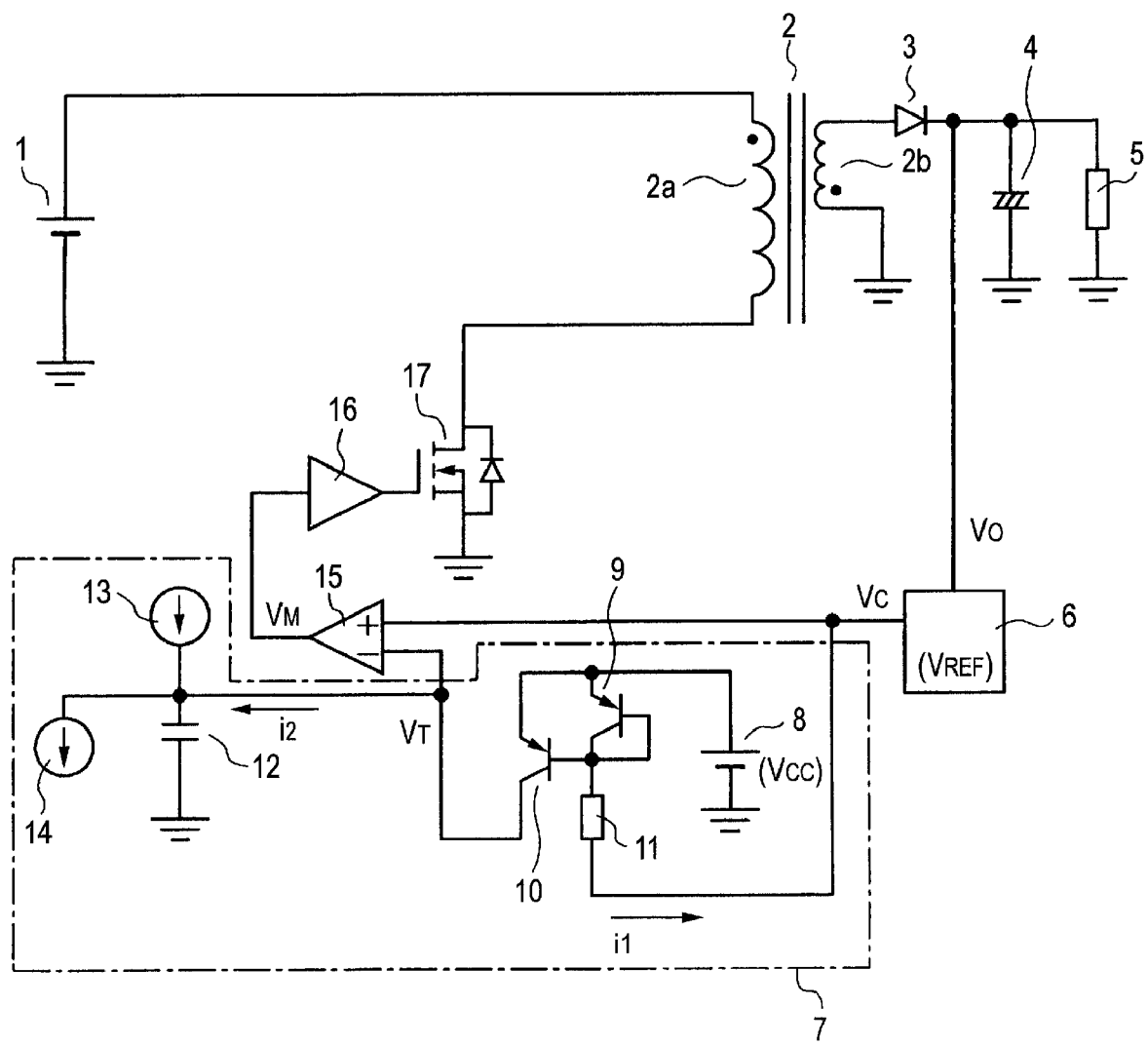
FIG. 1 is a circuit diagram showing a circuit configuration of a first embodiment of a DC-DC converter according to the present invention.
Figure 5:
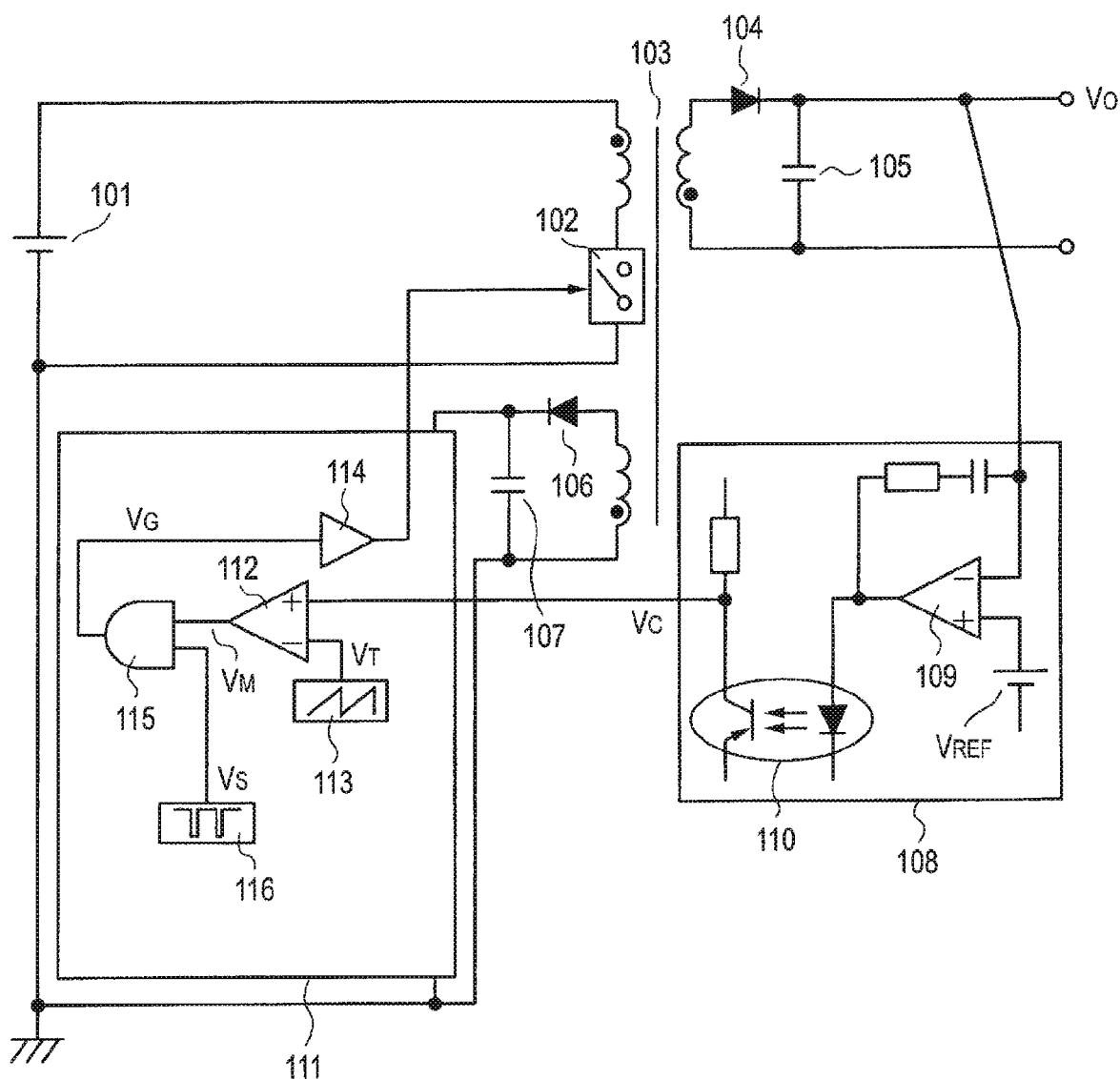
FIG. 5 is a circuit diagram showing a circuit configuration of a known DC-DC converter.

FIG. 1 is a circuit diagram showing a circuit configuration of a first embodiment of a DC-DC converter according to the present invention. The DC-DC converter has a transformer 2 having a primary winding 2a and a secondary winding 2b. The primary winding 2a is connected to a positive electrode of a DC power source 1, and the secondary winding is connected to a diode 3, which is connected to a capacitor 4 and a load 5. An output voltage detecting and adjusting circuit 6 is connected to the diode 3, the capacitor 4, and the load. The circuit 6, like the output voltage detecting and adjusting circuit 108 in FIG. 5, outputs a command value $V_C$ based on a comparison between an output voltage $V_O$ of the converter and a reference value $V_{REF}$.

Reference numeral 7 denotes a triangular generating circuit for generating a triangular wave $V_T$ on the basis of the command value $V_C$. The triangular generating circuit 7 has a reference power source 8 (with a power source voltage taken as $V_{CC}$), two transistors 9 and 10 with their emitters connected to a positive electrode of the reference power source 8, a resistor 11 with its one side connected to the collector of the transistor 9 and with the command value $V_C$ applied to the other side of the resistor 11, a capacitor 12 connected to the collector of the transistor 10, and a charging power source 13 and a discharging power source 14 both being connected to the capacitor 12. A voltage with a wave form at the connection points of the power sources 13 and 14 and the capacitor 12 is input to an inverting input terminal of a comparator 15 as a triangular wave $V_T$.

The comparator 15 compares the command value $V_C$ from the output voltage detecting and adjusting circuit 6 with the triangular wave $V_T$ and outputs a PWM signal $V_M$ that is at a "High" level when $V_C > V_T$, and is at a "Low" level when $V_C < V_T$. The PWM signal $V_M$ is applied to the gate of a semiconductor switching element 17, such as a MOSFET, through a driver 16. The switching element 17 is connected in series between the primary winding 2a of the transformer 2 and the ground.

Next, an operation of the embodiment of FIG. 1 will be explained with reference to FIG. 2, which is a waveform diagram showing an operation of the circuit shown in FIG. 1. The basic operation of the embodiment is carried out similarly as the known afore-mentioned converter. In the basic operation, the command value $V_C$, such a value as to match the output voltage $V_O$ to the reference value $V_{REF}$, is compared with the triangular wave $V_T$. By using the PWM signal $V_M$ with a voltage based on the result of the comparison, the PWM control of the switching element 17 is carried out.

Here, the current $i_1$ flowing in the resistor 11 in the triangular wave generating circuit 7 is given as $i_1 = (V_{CC} - V_9 - V_C)/R_{11}$, where $V_9$ is a forward voltage drop across the transistor 9 and $R_{11}$ is the resistance of the resistor 11. Reducing the command value $V_C$ under a light load increases the current $i_1$. This also increases the current $i_2$ ($i_1 \approx i_2$) flowing in the capacitor 12 from the transistor 10. Therefore, as shown in FIG. 2, the peak value of the triangular wave $V_T$ increases with the inclination thereof becoming more abrupt.

When the inclination of the triangular wave $V_T$ becomes more abrupt, the pulse width of the PWM signal $V_M$ becomes narrower, reducing the output voltage $V_O$. The reduced $V_O$ operates the output voltage detecting and adjusting circuit 6 to increase the command value $V_C$ so that the output voltage $V_O$ matches the reference value $V_{REF}$. When the specified output voltage $V_O$ is obtained, the command value $V_C$ is stabilized.

Figure 2:
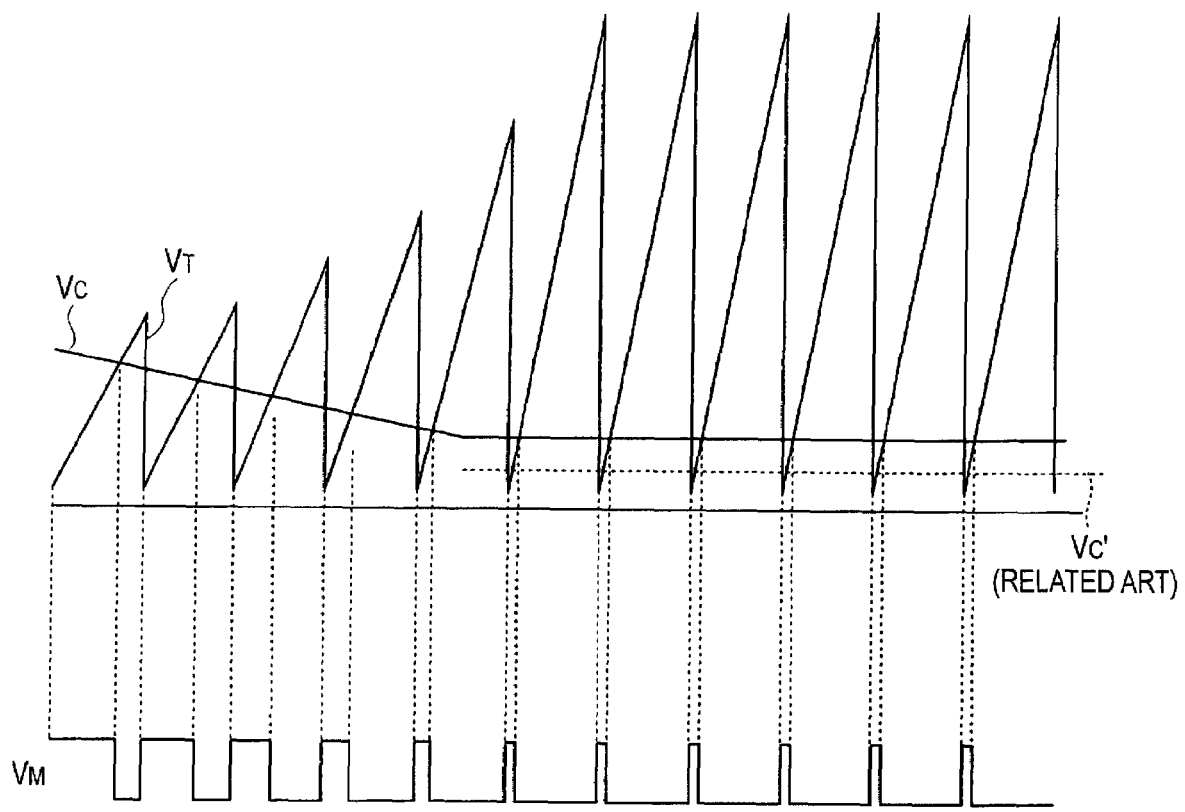
FIG. 2 is a waveform diagram showing an operation of the circuit shown in FIG. 1.
Figure 6:
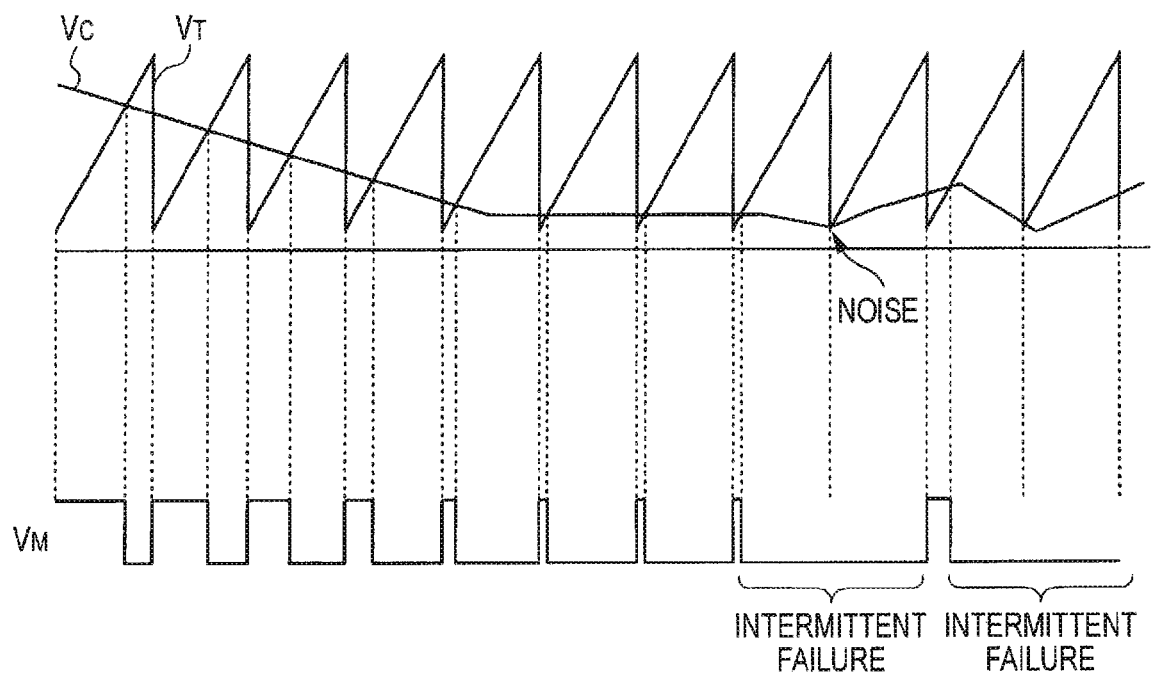
FIG. 6 is a waveform diagram showing an operation of the circuit shown in FIG. 5.

According to the first embodiment, as shown in FIG. 2, the reduced command value $V_C$ can be larger than the command value $V_C{}'$ in the known afore-mentioned DC-DC converter, where the inclination of the triangular wave $V_T$ is not varied. See FIG. 6. Therefore, even though the command value $V_C$ is temporarily reduced under a light load, the command value $V_C$ can be immediately increased. This eliminates the possibility of the PWM signal $V_M$ being affected by noise included in the command value, as experienced in the known afore-mentioned DC-DC converter when comparing the command value $V_C$ with the triangular wave $V_T$ by the comparator 15. Hence, without causing any intermittent failure as shown in FIG. 6, a stabilized PWM signal $V_M$ can be output from the comparator 15 carrying out comparison of the triangular wave $V_T$ and the command value $V_C$ to enable the switching element 17 to perform a stabilized switching operation.

Figure 3:
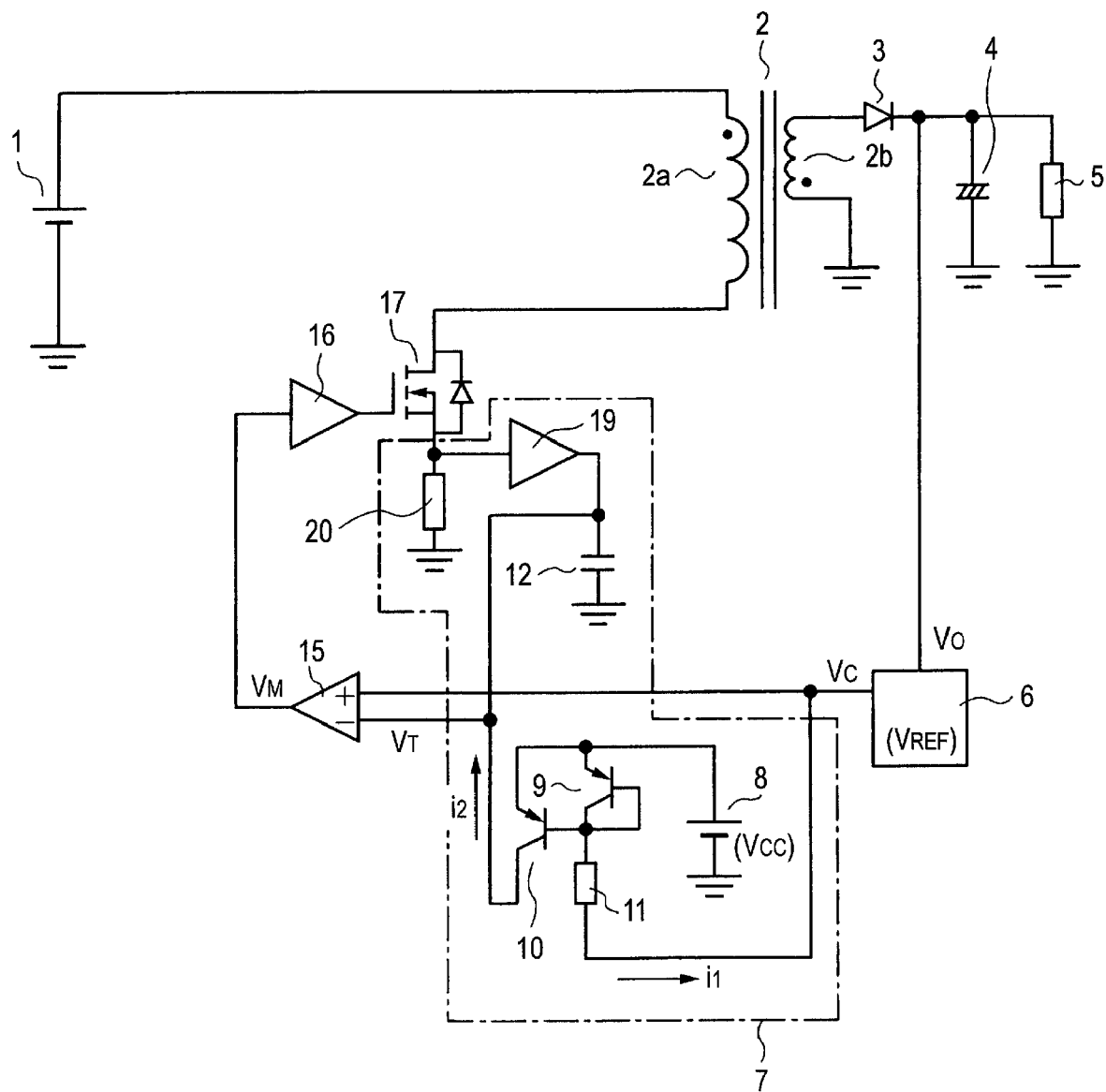
FIG. 3 is a circuit diagram showing a circuit configuration of a second embodiment of a DC-DC converter according to the present invention.

Next, FIG. 3 is a circuit diagram showing a circuit configuration of a second embodiment of a DC-DC converter according to the present invention. In FIG. 3, constituents being the same as those shown in FIG. 1 are designated by the same reference numerals, with explanations thereof being omitted. In the following, explanations will be concentrated on the parts different from those shown in FIG. 1. In the second embodiment, the configuration of a triangular wave generating circuit 7 is different from that shown in FIG. 1. Namely, a resistor 20 is connected between the ground and the switching element 17 connected in series to the primary winding 2a of the transformer 2. The connection point of the switching element 17 and the resistor 20 is grounded through a series circuit of a voltage to a current converting circuit 19 and the capacitor 12. Moreover, the connection point of the voltage to the current converting circuit 19 and the capacitor 12 is connected to the collector of the transistor 10 and to the inverting input terminal of the comparator 15.

In the second embodiment, the voltage generated across the resistor 20 at turning ON operation of the switching element 17 is converted to current by the current converting circuit 19, by which the capacitor 12 is charged. With the voltage wave form of the capacitor 12 taken as a triangular wave $V_T$, the voltage is compared with the command value $V_C$ by the comparator 15, by which an operation like that in the embodiment shown in FIG. 1 can be carried out. Namely, reducing the command value $V_C$ increases the current $i_2$ flowing in the transistor 10 to increase the voltage superimposed on the voltage across the capacitor 12 in the same way as that described in the foregoing to result in more abrupt inclination of the triangular wave $V_T$. Therefore, reducing the output voltage $V_O$ increases the command value $V_C$ to thereby allow the PWM signal $V_M$ to prevent intermittent failures.

Figure 4:
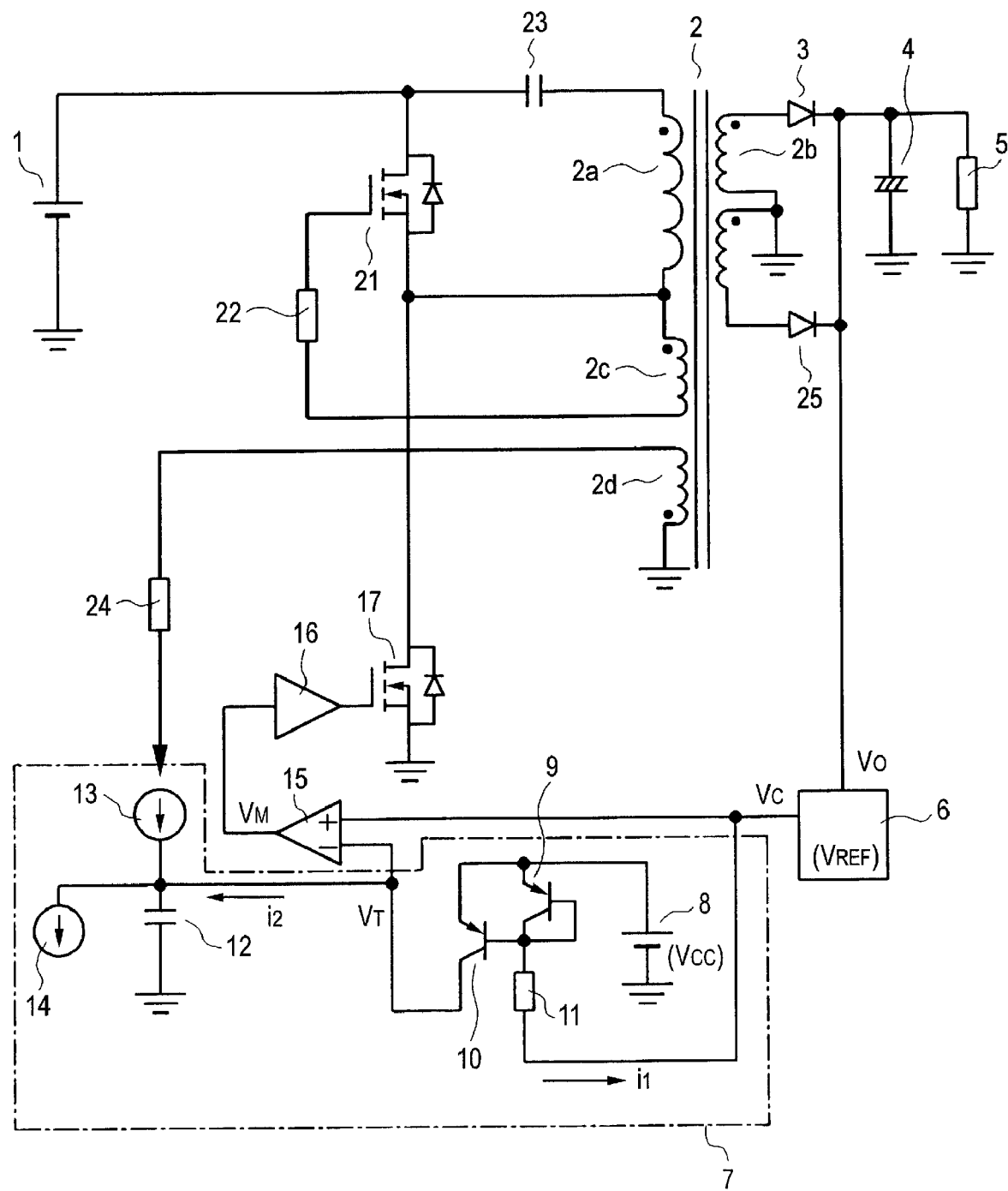
FIG. 4 is a circuit diagram showing a circuit configuration of an example of modification of the first embodiment.

FIG. 4 shows a circuit diagram showing a modified circuit configuration of the first embodiment. This modified embodiment also can be applied, for example, to control a switching element in a lower arm of a DC-DC converter using a self-exiting current resonant circuit of FIGS. 1 and 5 of JP-A-2002-209381. Specifically, in FIG. 4, reference numerals $2c$ and $2d$ denote auxiliary windings of the transformer 2. One end of the auxiliary winding $2c$ is connected to the gate of a semiconductor switching element 21 through a resistor 22 for turning the switching element 21 ON and OFF by a voltage generated in the auxiliary winding $2c$. The switching element 21 is connected in parallel to the primary winding $2a$ through a resonant capacitor 23. One end of the auxiliary winding $2d$ is led to the triangular wave generating circuit 7 through a resistor 24 to start oscillation for forming triangular waves by the voltage generated in the auxiliary winding $2d$.

In FIG. 4, the secondary winding $2b$ is of a center tap type and reference numeral 25 denotes a rectifying diode. The semiconductor switching elements 17 and 21 are alternately turned ON and OFF to thereby supply a desired DC power to the load 5 on the secondary side of the transformer 2. In such a DC-DC converter, like the converter in the first embodiment, a stabilized PWM signal $V_M$ can be output from the comparator 15 carrying out comparison of the triangular wave $V_T$ and the command value $V_C$ to enable the switching element 17. This allows the switching elements 17 and 21 to perform the switching operation without causing any intermittent failure of the PWM signal $V_M$, such as shown in FIG. 6.

In the present DC-DC converter, reducing the command value under a light load increases the current flowing in the capacitor, by which the inclination of the triangular wave becomes more abrupt. Although the output voltage is reduced, it increases the command value by the operation of the output voltage detecting and adjusting unit so that the reduced output voltage is made to match the reference value. Therefore, the command value can be stabilized at the time when a specified output voltage is obtained. This prevents intermittent failures of the PWM signal due to incorrect comparison between the command value and the triangular wave to allow the DC-DC converter to output a desired DC voltage. Moreover, the present DC-DC converter eliminates the need for a dummy load. This enhances the efficiency of the converter while preventing generation of noise in the transformer.

While the present invention has been particularly shown and described with reference to preferred embodiments thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, JP PA 2005-266268, filed on 14 Sep. 2005. The disclosure of the priority application, in its entirety, including the drawings, claims, and the specification thereof, is incorporated herein by reference.

What is claimed is:

1. A DC-DC converter comprising:
    a transformer having a primary winding for applying a DC voltage and a secondary winding for connecting to a load;
    a semiconductor switching element connected to the primary winding; and
    a control unit that controls turning ON and OFF periods of the switching element to match an output voltage of the secondary winding to a reference value,
    wherein the switching element is turned ON and OFF to supply a DC voltage equal to the reference value for the load through the secondary wiring of the transformer,
    wherein the control unit comprises:
    an adjusting unit that outputs a command value adjusted for the output voltage of the secondary winding and the reference value;
    a triangular wave generating unit that generates a triangular wave; and
    a comparing unit that compares the command value and the triangular wave to generate a driving signal for the switching element based on the comparison,
    wherein the triangular wave generating unit varies the inclination of the triangular wave in response to increase and decrease of the command value.

2. The DC-DC converter according to claim 1, wherein the triangular wave generating unit comprises:
    a capacitor for connecting to a charging and discharging power source; and
    a unit that changes the voltage across the capacitor by flowing current whose amount depends on the magnitude of the command value, into the capacitor,
    wherein the voltage across the capacitor is input to the comparing unit with the waveform of the voltage formed as the triangular wave.

3. The DC-DC converter according to claim 1, wherein the triangular wave generating unit comprises:
    a capacitor charged with a voltage depending on an amount of current flowing in the switching element; and
    a unit that changes the voltage across the capacitor by flowing current, whose amount depends on the magnitude of the command value, into the capacitor,
    wherein the voltage across the capacitor is input to the comparing unit with the waveform of the voltage formed as the triangular wave.

4. A method of controlling a DC-DC converter comprising a transformer having a primary winding for applying a DC voltage and a secondary winding for connecting to a load, a semiconductor switching element connected to the primary winding, and a control unit that controls turning ON and OFF periods of the switching element to match an output voltage of the secondary winding to a reference value, wherein the switching element is turned ON and OFF to supply a DC voltage equal to the reference value for the load through the secondary wiring of the transformer, the control unit comprising an adjusting unit, a triangular unit, and a comparing unit, the method comprising the steps of:
    outputting a command value adjusted for the output voltage of the secondary winding and the reference value with the adjusting unit;
    generating a triangular wave with the triangular wave generating unit;
    comparing the command value and the triangular wave to generate a driving signal for the switching element based on the comparison with the comparing unit; and
    varying the inclination of the triangular wave in response to increase and decrease of the command value with the triangular wave generating unit.

* * * * *